United States Patent
Kim et al.

(10) Patent No.: US 10,003,064 B2
(45) Date of Patent: Jun. 19, 2018

(54) SECONDARY BATTERY

(71) Applicant: SAMSUNG SDI CO., LTD., Yongin-si, Gyeonggi-do (KR)

(72) Inventors: Hyunchul Kim, Yongin-si (KR); Hyejung Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 228 days.

(21) Appl. No.: 14/876,849

(22) Filed: Oct. 7, 2015

(65) Prior Publication Data

US 2016/0380251 A1 Dec. 29, 2016

(30) Foreign Application Priority Data

Jun. 29, 2015 (KR) ........................ 10-2015-0092171

(51) Int. Cl.
*H01M 2/20* (2006.01)
*H01M 2/02* (2006.01)
(Continued)

(52) U.S. Cl.
CPC ......... *H01M 2/204* (2013.01); *H01M 2/0242* (2013.01); *H01M 2/0262* (2013.01); *H01M 2/0277* (2013.01); *H01M 2/0285* (2013.01); *H01M 2/0287* (2013.01); *H01M 2/043* (2013.01); *H01M 2/0473* (2013.01);
(Continued)

(58) Field of Classification Search
CPC ........... H01M 10/0525; H01M 2/0242; H01M 2/0262; H01M 2/0277; H01M 2/0285; H01M 2/0287; H01M 2/043; H01M 2/0473; H01M 2/0482; H01M 2/0486; H01M 2/1653; H01M 2/204; H01M 2/206; H01M 2/22
See application file for complete search history.

(56) References Cited

U.S. PATENT DOCUMENTS 1,545,328 A 7/1925 Holland
4,600,664 A * 7/1986 Cramer ................. H01M 2/043
429/7

(Continued)

FOREIGN PATENT DOCUMENTS

EP 2 357 688 A1 8/2011
EP 2 677 587 A1 12/2013
(Continued)

OTHER PUBLICATIONS

Extended European Search Report dated Feb. 4, 2016 in Corresponding European Patent Application No. 15194913.8.

*Primary Examiner* — Ula C Ruddock
*Assistant Examiner* — Ben Lewis
(74) *Attorney, Agent, or Firm* — Lee & Morse P.C.

(57) ABSTRACT

A secondary battery, including a case having one or more partition walls providing a plurality of accommodating spaces; a plurality of electrode assemblies in the accommodating spaces with an electrolyte, the plurality of electrode assemblies including electrode tabs; and a cap assembly including a cap plate sealing a top portion of the case, the cap assembly having the electrode tabs drawn therefrom and first connection tabs electrically connecting the plurality of electrode assemblies through the electrode tabs, the partition walls being impregnated with the electrolyte.

6 Claims, 8 Drawing Sheets

(51) Int. Cl.
*H01M 2/04* (2006.01)
*H01M 2/16* (2006.01)
*H01M 2/22* (2006.01)
*H01M 10/0525* (2010.01)

(52) U.S. Cl.
CPC ....... *H01M 2/0482* (2013.01); *H01M 2/0486* (2013.01); *H01M 2/1653* (2013.01); *H01M 2/206* (2013.01); *H01M 2/22* (2013.01); *H01M 10/0525* (2013.01)

(56) References Cited

U.S. PATENT DOCUMENTS

| | | | | |
|---|---|---|---|---|
| 5,464,701 | A * | 11/1995 | Rey | H01M 2/0242 429/177 |
| 2003/0064283 | A1 | 4/2003 | Uemoto et al. | |
| 2004/0194489 | A1* | 10/2004 | Pode | B60H 1/00278 62/259.2 |
| 2006/0166087 | A1 | 7/2006 | Ogata et al. | |
| 2010/0216004 | A1 | 8/2010 | Yoon | |
| 2011/0091766 | A1* | 4/2011 | Kim | H01M 2/021 429/176 |
| 2011/0269002 | A1 | 11/2011 | Kanata et al. | |
| 2013/0089761 | A1* | 4/2013 | Schiemann | H01M 2/0242 429/61 |
| 2013/0323573 | A1* | 12/2013 | Tanaka | H01M 2/0242 429/154 |

FOREIGN PATENT DOCUMENTS

| | | |
|---|---|---|
| JP | 2003-109655 A | 4/2003 |
| JP | 4918625 B2 | 4/2012 |
| KR | 10-2010-0096994 A | 9/2010 |

* cited by examiner

SECONDARY BATTERY

CROSS-REFERENCE TO RELATED APPLICATION

Korean Patent Application No. 10-2015-0092171, filed on Jun. 29, 2015, in the Korean Intellectual Property Office, and entitled: "Secondary Battery," is incorporated by reference herein in its entirety.

BACKGROUND

1. Field

Embodiments relate to a secondary battery.

2. Description of the Related Art

A comparative battery pack having a multiple series/parallel structure may be manufactured by utilizing multiple unit cells, and connecting the unit cells to one another in series and in parallel.

SUMMARY

Embodiments may be realized by providing a secondary battery, including a case having one or more partition walls providing a plurality of accommodating spaces; a plurality of electrode assemblies in the accommodating spaces with an electrolyte, the plurality of electrode assemblies including electrode tabs; and a cap assembly including a cap plate sealing a top portion of the case, the cap assembly having the electrode tabs drawn therefrom and first connection tabs electrically connecting the plurality of electrode assemblies through the electrode tabs, the partition walls being impregnated with the electrolyte.

The partition walls may cut off movement of electrons among the accommodating spaces and may transfer a solvent and a salt of the electrolyte to adjacent accommodating spaces among the plurality of accommodating spaces.

Each of the partition walls may be a membrane-type porous layer including one or more of polyurethane or oriented polystyrene (OPS).

The case may include a body part for accommodating the plurality of electrode assemblies and an extension part extending from an outer periphery of a top end of the body part and protruding higher than the top end of the body part, the case may include a first internal layer, a first external layer, and a first functional layer interposed between the first internal layer and the first external layer, the first internal layer and the first external layer may include a plastic material, and the first functional layer may include one or more of a metal or an inorganic compound.

The cap assembly may further include a cover coupled to the top end of the case, the cover covering the cap plate and an electrode terminal electrically connected to the electrode tabs and exposed to the outside while passing through the cover, the cover may include a second internal layer, a second external layer, and a second functional layer interposed between the second internal layer and the second external layer, the second internal layer and the second external layer may include a plastic material, and the second functional layer may include one or more of a metal or an inorganic compound.

The case and the cover may be coupled to each other such that the extension part of the case and a bottom portion of the cover are welded to each other.

A stepped portion may be formed at the top end of the body part by the extension part, an O ring or a gasket may be coupled to an edge of the cap plate, and the cap plate may be coupled to the stepped portion with the O ring or the gasket.

A plurality of insertion grooves corresponding to edges of the partition walls may be on an inner surface of the case and a bottom surface of the cap plate, the O ring or the gasket may be coupled to the edges of the partition walls, and the partition walls may be engaged with the insertion grooves with the O ring or the gasket.

Among the plurality of electrode assemblies, the electrode assemblies positioned between each of the accommodating spaces may be connected to one another in series by the first connection tabs.

The cap assembly may further include second connection tabs, and when the plurality of electrode assemblies are in the accommodating spaces, respectively, the electrode assemblies in the respective accommodating spaces may be connected to one another in parallel by the second connection tabs.

BRIEF DESCRIPTION OF THE DRAWINGS

Features will become apparent to those of skill in the art by describing in detail exemplary embodiments with reference to the attached drawings in which:

FIGS. 9(*a*) and 9(*b*) illustrate a plan view and a cross-sectional view of a cap plate according to an embodiment.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
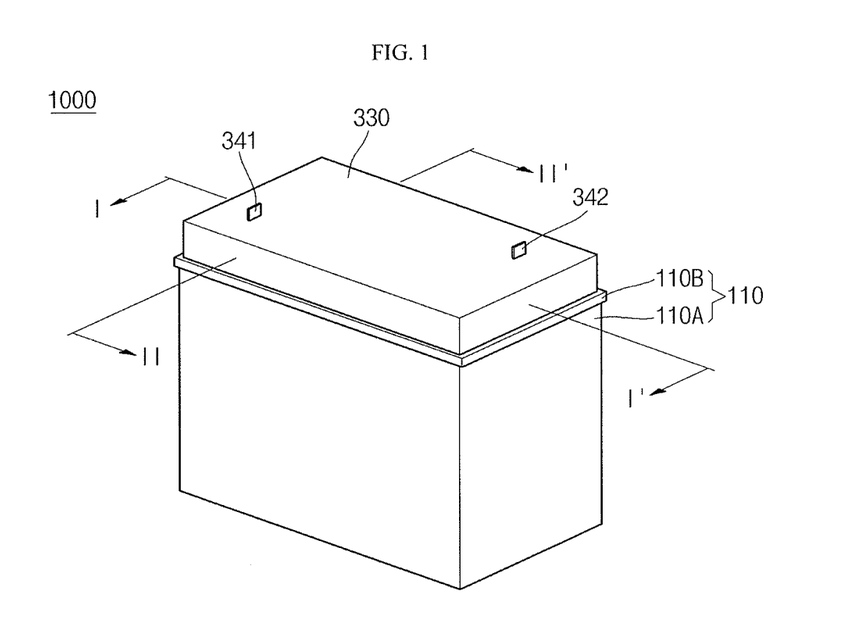
FIG. 1 illustrates a perspective view of a secondary battery according to an embodiment.
Figure 2:
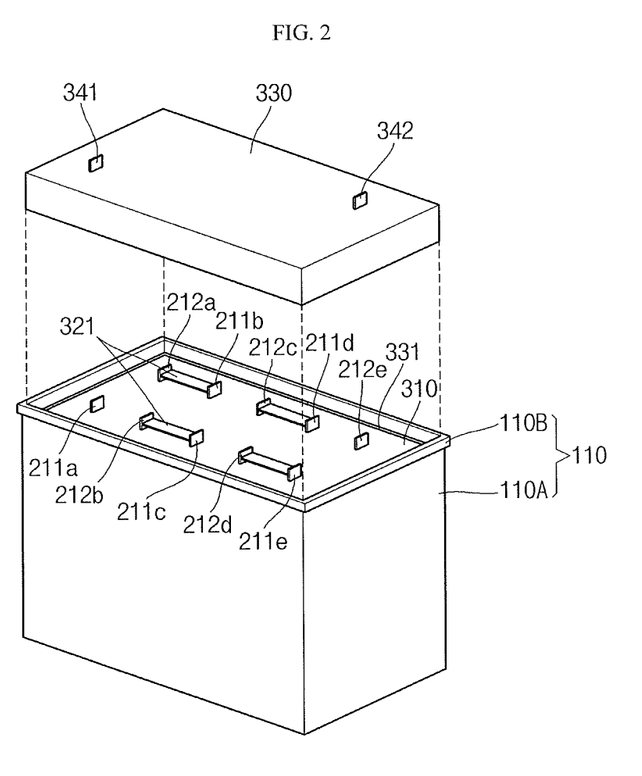
FIG. 2 illustrates a perspective view of a cover and a case according to an embodiment assembled with each other.
Figure 3:
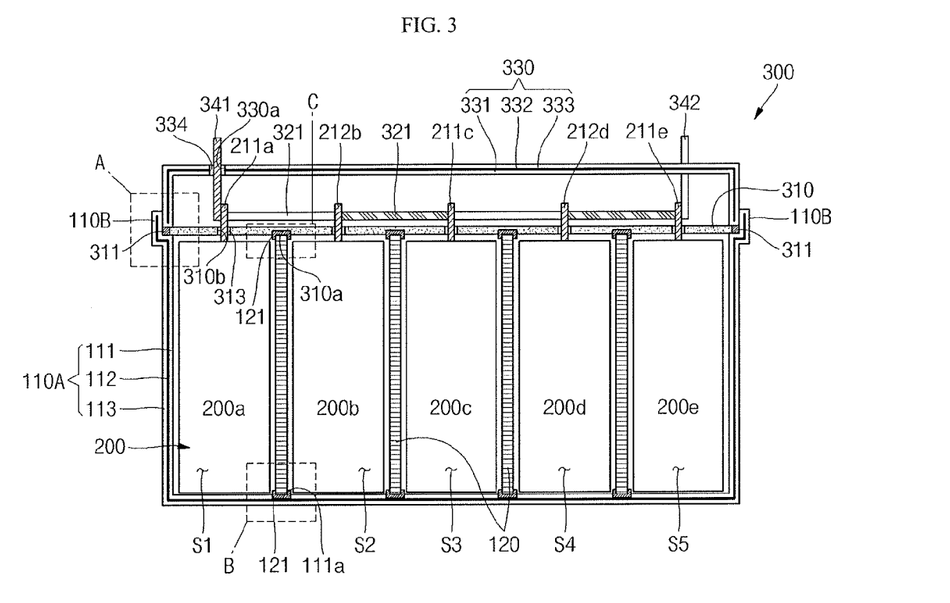
FIG. 3 illustrates a cross-sectional view taken along the line I-I' of FIG. 1.
Figure 4:
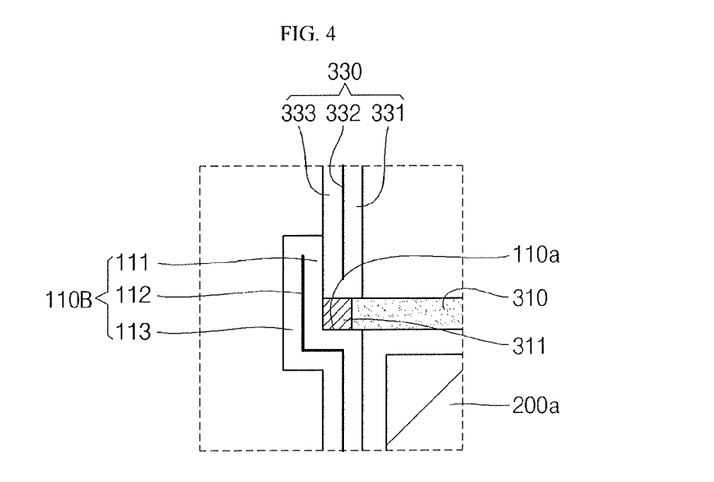
FIG. 4 illustrates an enlarged view of a portion A of FIG. 3.

FIG. 1 illustrates a perspective view of a secondary battery according to an embodiment, FIG. 2 illustrates a perspective view of a cover and a case according to an embodiment assembled with each other, FIG. 3 illustrates a cross-sectional view taken along the line I-I' of FIG. 1, FIG. 4 illustrates an enlarged view of a portion A of FIG. 3, FIG.

Figure 5:
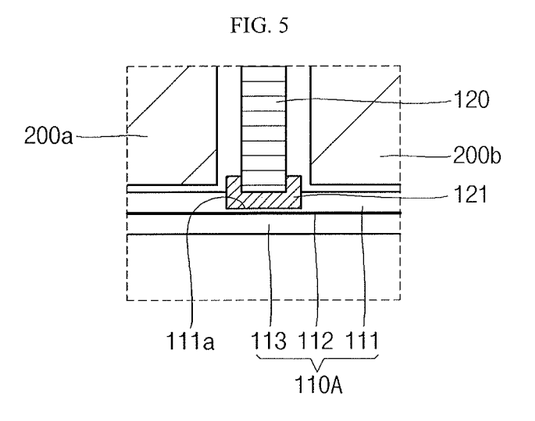
FIG. 5 illustrates an enlarged view of a portion B of FIG. 3.
Figure 6:
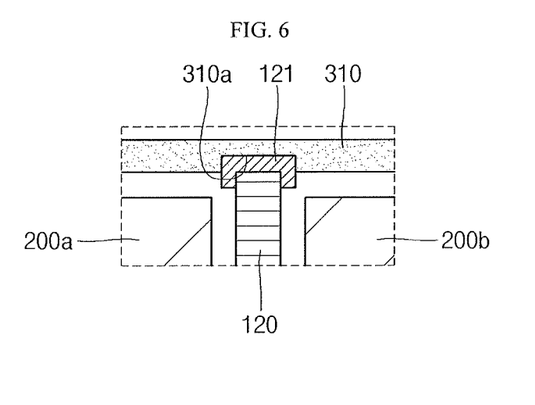
FIG. 6 illustrates an enlarged view of a portion C of FIG. 3.
Figure 7:
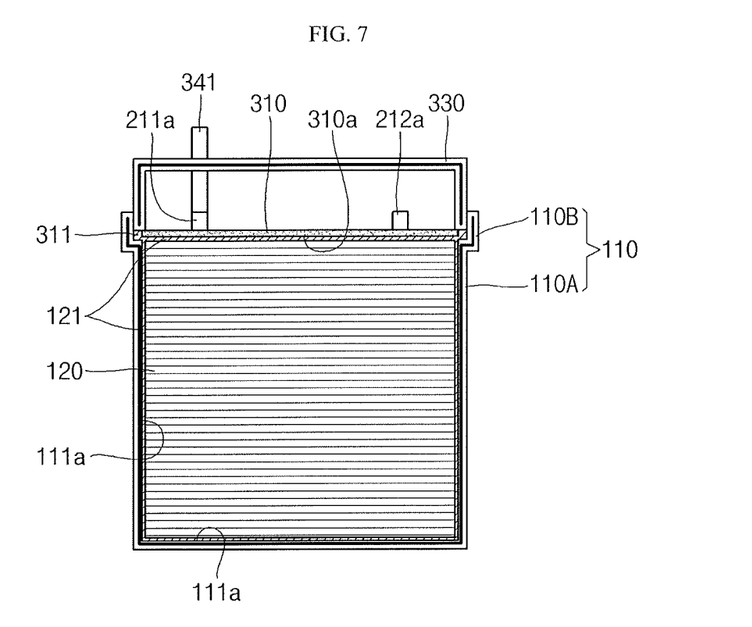
FIG. 7 illustrates a cross-sectional view taken along the line II-II' of FIG. 1.
Figure 8:
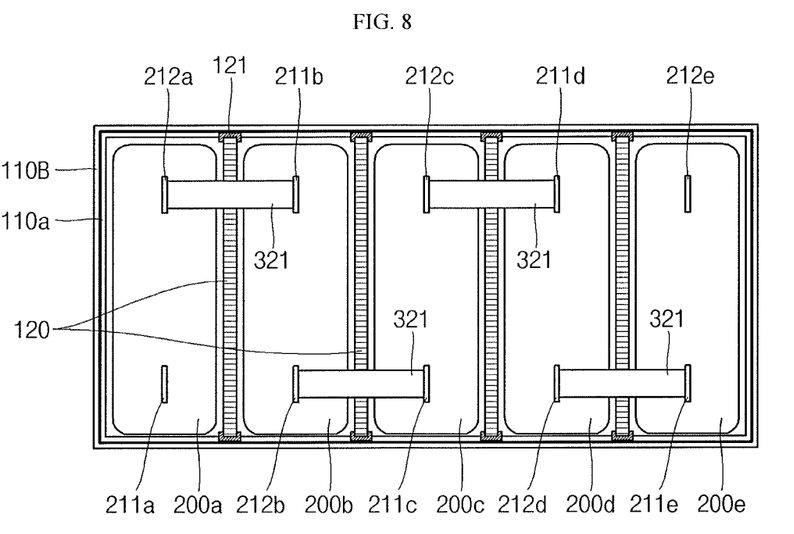
FIG. 8 illustrates a plan view of the secondary battery from which the cover and the case according to an embodiment are removed.
Figure 9A:
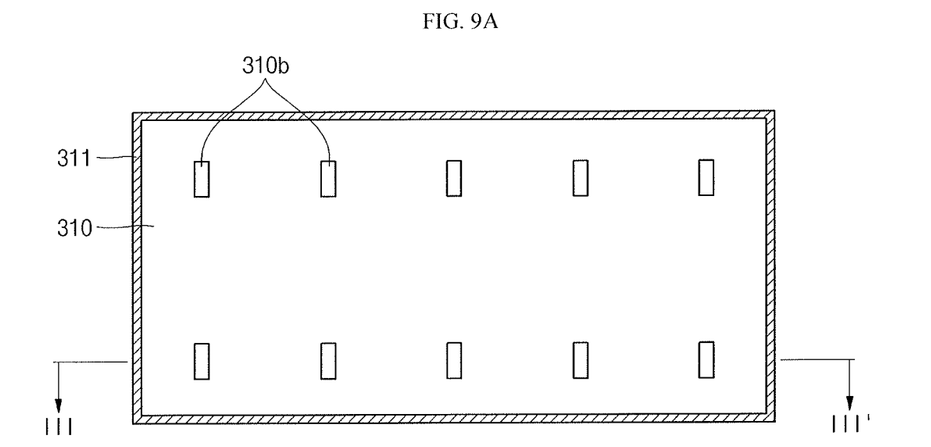
Figure 9B:
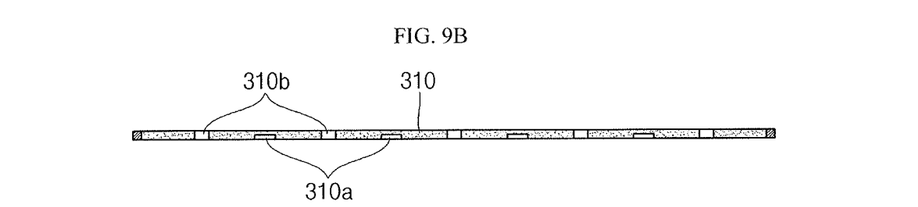

5 illustrates an enlarged view of a portion B of FIG. 3, FIG. 6 illustrates an enlarged view of a portion C of FIG. 3, FIG. 7 illustrates a cross-sectional view taken along the line II-II' of FIG. 1, FIG. 8 illustrates a plan view of the secondary battery from which the cover and the case according to an embodiment are removed, and FIGS. 9(a) and 9(b) illustrate a plan view and a cross-sectional view of a cap plate according to an embodiment.

Referring to FIGS. 1 to 9, the secondary battery 1000 according to an embodiment may include a case 100, an electrode assembly 200 and a cap assembly 300.

As illustrated in FIG. 3, the case 100 may include a body part 110A, an extension part 110B and partition walls 120.

The body part 110A may accommodate the electrode assembly 200 and may be shaped of, e.g., in a shape of, a rectangular parallelepiped having a top opening. The body part 110A may include a first internal layer 111, a first functional layer 112 and a first external layer 113.

The first internal layer 111, which may form the innermost structure of the body part 110A, may be made of a plastic material.

The first functional layer 112, which may be interposed between the first internal layer 111 and the first external layer 113, may include one or more of a metal or an inorganic compound.

For example, the first functional layer 112 may be formed as a metal-inorganic compound based thin film or a metal foil or sheet between the first internal layer 111 and the first external layer 113. When the first functional layer 112 is formed as a metal-inorganic compound based thin film, the first functional layer 112 may be formed by one of chemical vapor deposition (CVD), physical vapor deposition (PVD), atomic layer deposition (ALD) and plating. When the first functional layer 112 is formed as a metal foil or sheet, the first functional layer 112 may be formed by interposing the metal foil or sheet between the first internal layer 111 and the first external layer 113 using multiple injection molds.

The first external layer 113, which may form the outermost structure of the body part 110A, may be made of a plastic material. For example, the first external layer 113 may be formed using a material demonstrating little reactivity with the electrolyte accommodated in the case 100 and having an insulating property.

The first functional layer 112 may block moisture or gases. The first internal layer 111 and the first external layer 113 may support the first functional layer 112.

The extension part 110B may extend from the outer periphery of a top end of the body part 110A and may protrude higher than the top end of the body part 110A. The extension part 110B may be formed along the outer periphery of the top end of the body part 110A in the form of a sidewall surrounding the outer periphery of a top end of the body part 110A, and a stepped portion 110a may be formed at the top end of the body part 110A by the extension part 110B.

The extension part 110B may be formed to extend from the body part 110A, and the extension part 110B may include the first internal layer 111, the first functional layer 112 and the first external layer 113, like the body part 110A.

As described above, the case 100 may be formed such that functional layers made of a metal or/and inorganic compound may be inserted into a plastic case, and the case 100 may be advantageous in view of degrees of freedom in shape, lightness in weight, and manufacturing costs, compared to a comparative metal case, while achieving the same strength, vapor resistance, swelling control, chemical resistance, abrasion resistance, and heat dissipation.

The partition walls 120 may include a plurality of partition walls, for example, a plurality of accommodating spaces S1, S2, S3, S4 and S5, installed in the case 100. For example, as illustrated in FIG. 3, first to fifth accommodating spaces S1, S2, S3, S4 and S5 may be formed in the case 100 by four partition walls 120.

The partition walls 120 may impregnate, e.g., may be impregnated with, the electrolyte accommodated in the first to fifth accommodating spaces S1, S2, S3, S4 and S5, and may provide the accommodated electrolyte to the first to fifth accommodating spaces S1, S2, S3, S4 and S5.

The electrolyte accommodated in the case 100 may be exhausted over the passage of time, and amounts or concentrations of the electrolyte may vary. For example, the electrolyte accommodated in an accommodating space may be isolated from the electrolyte accommodated in another accommodating space adjacent to the accommodating space, and a dispersion difference of the electrolyte may be created among the accommodating spaces. A significant difference in the electrolyte exhausted may be one of factors of degrading battery cell performance.

According to the present embodiment, in order to solve a problem due to, for example, the significant difference in the electrolyte exhausted, when the electrolyte accommodated in each of the first to fifth accommodating spaces S1, S2, S3, S4 and S5 has a constant concentration, some of the electrolyte may be impregnated in the partition walls 120. When there is a concentration difference between electrolytes accommodated in the first to fifth accommodating spaces S1, S2, S3, S4 and S5, a solvent and a salt of the electrolyte impregnated in the partition walls 120 may be transferred to the accommodating space accommodating the electrolyte having a relatively low concentration. The solvent and the salt of the electrolyte impregnated in the partition walls 120 may be transferred to the accommodating space by an osmotic pressure. The partition walls 120 may cut off movement of electrons among the first to fifth accommodating spaces S1, S2, S3, S4 and S5.

The partition walls 120 may include organic materials, inorganic materials or organic/inorganic materials. For example, each of the partition walls 120 may be formed as a membrane-type porous layer including one or more of polyurethane or oriented polystyrene (OPS).

Each of the partition walls 120 formed as a thin film or a metal foil or sheet may have an increased thickness in a state in which the electrolyte is impregnated therein, and a tolerance between cells may be minimized.

A first O ring or a gasket 121 may be coupled to the edge of each of the partition walls 120. In order to prevent the electrolyte from being unnecessarily shared by the accommodating spaces, the first O ring or the gasket 121 may seal portions between each of the partition walls 120 and the case 100 and between each of the partition walls 120 and the cap assembly 300.

As described above, the partition walls 120 may be configured to cut off movement of electrons among the accommodating spaces, while the electrolyte is shared by the accommodating spaces, and degradation in cell performance due to, for example, a significant difference in the exhausted electrolyte among the accommodating spaces, may be minimized.

As illustrated in FIGS. 5 and 7, a first insertion groove 111a may be formed in the first internal layer 111, and as illustrated in FIGS. 6 and 9, a second insertion groove 310a may be formed in a bottom surface of a cap plate 310. The first and second insertion grooves 111a and 310a may be formed to correspond to edges of the partition walls 120. The edges of the partition walls 120 may be inserted into the first and second insertion grooves 111a and 310a together with the first O ring or the gasket 121 to be engaged with each other. Side and bottom edges of the partition walls 120 may be inserted into the first insertion groove 111a and top edges of the partition walls 120 may be inserted into the second insertion groove 310a, and the partition walls 120 may be more tightly coupled to the case 100. In addition, the partition walls 120 may be more easily installed in the case 100.

As illustrated in FIG. 3, the electrode assembly 200 may include first to fifth electrode assemblies 200a, 200b, 200c, 200d and 200e and may be accommodated in the case 100 together with an electrolyte. For example, the first to fifth electrode assemblies 200a, 200b, 200c, 200d and 200e may be accommodated one by one in the first to fifth accommodating spaces S1, S2, S3, S4 and S5, respectively. The first electrode assembly 200a may be accommodated in the first accommodating space S1, the second electrode assembly 200b may be accommodated in the second accommodating space S2, the third electrode assembly 200c may be accommodated in the third accommodating space S3, the fourth electrode assembly 200d may be accommodated in the fourth accommodating space S4, and the fifth electrode assembly 200e may be accommodated in the fifth accommodating space S5.

Each of the first to fifth electrode assemblies 200a, 200b, 200c, 200d and 200e may be configured by winding or stacking a first electrode plate, a second electrode plate and a separator. The first to fifth electrode assemblies 200a, 200b, 200c, 200d and 200e may include first electrode tabs 211a, 211b, 211c, 211d and 211e, which may be electrically connected to the first electrode plate, and second electrode tabs 212a, 212b, 212c, 212d and 212e, which may be electrically connected to the second electrode plate.

The first electrode tabs 211a, 211b, 211c, 211d and 211e and the second electrode tabs 212a, 212b, 212c, 212d and 212e may be exposed to a top portion of the cap plate 310 while passing through the cap plate 310.

The cap assembly 300 may include the cap plate 310, a plurality of connection tabs 321, a cover 330, a first electrode terminal 341 and a second electrode terminal 342.

The cap plate 310 may seal the top portion of the case 100, which may be opened, and the cap plate 310 may be sized and shaped to correspond to the top portion of the case 100. For example, the cap plate 310 may be shaped of, e.g., in a shape of, a rectangular plate.

The second insertion groove 310a may be formed on the bottom surface of the cap plate 310 to insert the top edges of the partition walls 120 thereinto. A plurality of tab holes 310b allowing the respective electrode tabs to pass therethrough may be formed at portions of the cap plate 310, the portions corresponding to the first electrode tabs 211a, 211b, 211c, 211d and 211e and the second electrode tabs 212a, 212b, 212c, 212d and 212e. A third gasket 313 may be assembled with the tab holes 310b, and the tab holes 310b may be more tightly sealed.

A second O ring or a gasket 311 may be coupled to the edge of the cap plate 310, and the top portion of the case 100 may be more tightly sealed.

The cap plate 310 may be inserted into the extension part 110B and may then be mounted on the top end of the body part 110A to then be coupled to the case 100. As illustrated in FIG. 4, the stepped portion 110a may be formed at the top end of the body part 110A by the extension part 110B, and the cap plate 310 may be assembled on the stepped portion 110a.

The first connection tabs 321 may be electrically connected to the first to fifth electrode assemblies 200a, 200b, 200c, 200d and 200e through the first electrode tabs 211a, 211b, 211c, 211d and 211e and the second electrode tabs 212a, 212b, 212c, 212d and 212e.

Among the plurality of connection tabs 321, for example, the second electrode tab 212a of the first electrode assembly 200a may be connected to the first electrode tab 211b of the second electrode assembly 200b, the second electrode tab 212b of the second electrode assembly 200b may be connected to the first electrode tab 211c of the third electrode assembly 200c, the second electrode tab 212c of the third electrode assembly 200c may be connected to the first electrode tab 211d of the fourth electrode assembly 200d, and the second electrode tab 212d of the fourth electrode assembly 200d may be connected to the first electrode tab 211e of the fifth electrode assembly 200e, and the first to fifth electrode assemblies 200a, 200b, 200c, 200d and 200e may be connected to one another in series.

The cover 330 may have an opened bottom portion shaped of, e.g., in a shape of, a substantially rectangular parallelepiped and may be coupled to the top end of the case 100 to allow the opened bottom portion of the cover 330 to face the opened top portion of the case 100. For example, in a state in which the bottom portion of the cover 330 is inserted into the extension part 110B of the case 100, the cover 330 and the extension part 110B may be welded to each other.

As illustrated in FIG. 3, the cover 330 may include a second internal layer 331, a second functional layer 332 and a first external layer 333.

The second internal layer 331, which may form the innermost structure of the cover 330, may be made of a plastic material.

The second functional layer 332, which may be interposed between the second internal layer 331 and the second external layer 333, may include one or more of a metal or an inorganic compound.

For example, the second functional layer 332 may be formed as a metal-inorganic compound based thin film or a metal foil or sheet between the second internal layer 331 and the second external layer 333. When the second functional layer 332 is formed as a metal-inorganic compound based thin film, the second functional layer 332 may be formed by one of chemical vapor deposition (CVD), physical vapor deposition (PVD), atomic layer deposition (ALD) and plating. When the second functional layer 332 is formed as a metal foil or sheet, the second functional layer 332 may be formed by interposing the metal foil or sheet between the second internal layer 331 and the second external layer 333.

The second external layer 333, which may form the outermost structure of the body part 110A, may be made of a plastic material. For example, the second external layer 333 may be formed using a material demonstrating little reactivity with the electrolyte accommodated in the case 100 and having an insulating property.

The second functional layer 332 may block moisture or gases. The second internal layer 331 and the second external layer 333 may support the second functional layer 332.

A plurality of terminal holes 330a may be formed in the cover 330. The first electrode terminal 341 and the second electrode terminal 342 may pass through the terminal holes 330a, a fourth gasket 334 may be assembled with the cover 330, and the cover 330 may be more tightly sealed.

The first electrode terminal 341 may be electrically connected to the first electrode tab 211a of the first electrode assembly 200a. The second electrode terminal 342 may be electrically connected to the second electrode tab 212e of the fifth electrode assembly 200e.

The first electrode tab 211a of the first electrode assembly 200a may be a terminal having a highest voltage level among the first to fifth electrode assemblies 200a, 200b, 200c, 200d and 200e connected to one another in series, and the second electrode tab 212e of the fifth electrode assembly 200e may be a terminal having a lowest voltage level among the first to fifth electrode assemblies 200a, 200b, 200c, 200d and 200e.

Figure 10:
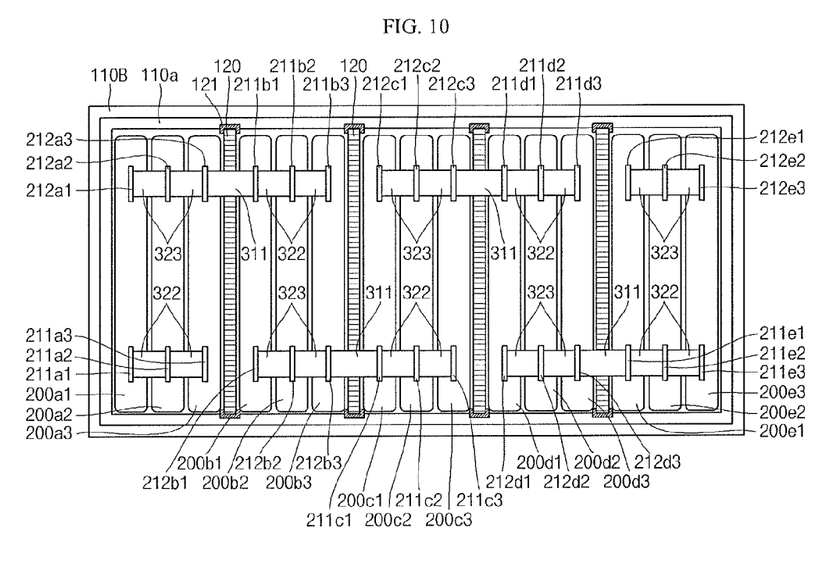
FIG. 10 illustrates a plan view of a secondary battery according to another embodiment.

FIG. 10 illustrates a plan view of a secondary battery according to another embodiment.

In the embodiment illustrated in FIG. 10, unlike in the previous embodiment, a plurality of electrode assemblies may be accommodated in a single accommodating space. The plurality of electrode assemblies accommodated in the single accommodating space may be connected to one another in parallel, the electrode assemblies between adjacent accommodating spaces may be connected to one another in series, and the secondary battery according to the present embodiment may further include second_first connection tabs 322 and second_second connection tabs 323, unlike the secondary battery according to the previous embodiment.

The second_first connection tabs 322 may connect first electrode tabs of the electrode assemblies accommodated in one single accommodating space to one another, and the second_second connection tabs 323 may connect second electrode tabs of the electrode assemblies accommodated in one single accommodating space to one another.

Among the first_first to first_third electrode assemblies 200a1, 200a2 and 200a3, for example, the first electrode tab 211a1 of the first_first electrode assembly 200a1, the first electrode tab 211a2 of the first_second electrode assembly 200a2, and the first electrode tab 211a3 of the first_third electrode assembly 200a3 may be connected to one another by the second_first connection tab and the first electrode tab 212a1 of the first_first electrode assembly 200a1, the first electrode tab 212a2 of the first_second electrode assembly 200a2, and the first electrode tab 212a3 of the first_third electrode assembly 200a3 may be connected to one another by the second_second connection tab 323, and the first_first to first_third electrode assemblies 200a1, 200a2 and 200a3 may be connected to one another in parallel.

According to the embodiment, in a cell-pack integrated structure, partition walls separating battery cells from one another may be configured to cut off movement of electrons while sharing an electrolyte among the accommodating spaces, and cell performance may be minimized from being degraded due to, for example, a significant difference in the exhausted electrolyte among the accommodating spaces.

An external case may be formed such that functional layers made of a metal or/and inorganic compound may be inserted into a plastic case, and the external case may be advantageous in view of degrees of freedom in shape, lightness in weight, and manufacturing costs, compared to a comparative metal case, while achieving the same strength, vapor resistance, swelling control, chemical resistance, abrasion resistance, and heat dissipation.

By way of summation and review, in order to manufacture a comparative multiple series/parallel battery pack, an increased number of components and many process steps may be required in housing the battery cells, and may lead to an increase in the manufacturing cost of the multiple series/parallel battery pack.

In a cell-pack integrated structure, unit cells and an electrolyte may be directly accommodated in a single case. A plurality of cell chambers may be provided to separate unit cells from each other in the battery pack.

However, the electrolyte accommodated in the case may be exhausted over the passage of time, and amounts or concentrations of the electrolyte may vary. For example, the electrolyte accommodated in an accommodating space may be isolated from the electrolyte accommodated in another accommodating space adjacent to the accommodating space, and a dispersion difference of the electrolyte may be created among the accommodating spaces. A significant difference in the electrolyte exhausted may degrade battery cell performance.

Embodiments provide a secondary battery, which may minimize the number of components and the manufacturing cost and may minimize degradation of cell performance due to, for example, a dispersion difference of an electrolyte.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   a case having one or more partition walls providing a plurality of accommodating spaces;
   a plurality of electrode assemblies in the plurality of accommodating spaces with an electrolyte, the plurality of electrode assemblies including electrode tabs; and
   a cap assembly including a cap plate sealing a top portion of the case, the cap assembly having the electrode tabs drawn therefrom and first connection tabs electrically connecting the plurality of electrode assemblies through the electrode tabs, wherein
   the partition walls are impregnated with the electrolyte, and are a membrane-type porous layer including one or more of polyurethane or oriented polystyrene (OPS) wherein:
   the case includes a body part for accommodating the plurality of electrode assemblies and an extension part extending from an outer periphery of a top end of the body part and protruding higher than the top end of the body part,
   the case includes a first internal layer, a first external layer, and a first functional layer interposed between the first internal layer and the first external layer,
   the first internal layer and the first external layer include a plastic material, and
   the first functional layer includes one or more of a metal or an inorganic compound, wherein:
   a stepped portion is formed at the top end of the body part by the extension part,
   an O ring or a gasket is coupled to an edge of the cap plate, and
   the cap plate is coupled to the stepped portion with the O ring or the gasket, and wherein:
   a plurality of insertion grooves corresponding to edges of the partition walls are on an inner surface of the case and a bottom surface of the cap plate, the O ring or the gasket is coupled to the edges of the partition walls, and the partition walls are engaged with the insertion grooves with the O ring or the gasket.

2. The secondary battery as claimed in claim 1, wherein the partition walls cut off movement of electrons among the accommodating spaces and transfer a solvent and a salt of the electrolyte to adjacent accommodating spaces among the plurality of accommodating spaces.

3. The secondary battery as claimed in claim 1, wherein:
the cap assembly further includes a cover coupled to the top end of the case, the cover covering the cap plate and an electrode terminal electrically connected to the electrode tabs and exposed to the outside while passing through the cover,
the cover includes a second internal layer, a second external layer, and a second functional layer interposed between the second internal layer and the second external layer,
the second internal layer and the second external layer include a plastic material, and
the second functional layer includes one or more of a metal or an inorganic compound.

4. The secondary battery as claimed in claim 3, wherein the case and the cover are coupled to each other such that the extension part of the case and a bottom portion of the cover are welded to each other.

5. The secondary battery as claimed in claim 1, wherein among the plurality of electrode assemblies, the electrode assemblies positioned between each of the accommodating spaces are connected to one another in series by the first connection tabs.

6. The secondary battery as claimed in claim 5, wherein:
the cap assembly further includes second connection tabs, and
when the plurality of electrode assemblies are in the accommodating spaces, respectively, the electrode assemblies in the respective accommodating spaces are connected to one another in parallel by the second connection tabs.

* * * * *